UNITED STATES PATENT OFFICE.

CHARLES J. INMAN, OF EUREKA, CALIFORNIA.

LUBRICANT.

SPECIFICATION forming part of Letters Patent No. 263,911, dated September 5, 1882.

Application filed July 5, 1882. (No specimens.)

*To all whom it may concern:*

Be it known that I, CHARLES J. INMAN, a citizen of the United States of America, residing at Eureka, in the county of Humboldt and State of California, have invented certain new and useful Improvements in Lubricants; and I do hereby declare the following to be a full, clear, and exact description of the invention, such as will enable others skilled in the art to which it appertains to make and use the same.

My invention relates to a composition of matter intended to be used as a lubricant for journals.

I take mutton-tallow, thirty-five pounds; beeswax, five pounds; castor-oil, fifty pounds, and heat them until they are mixed. I then dissolve seven pounds of borax and three pounds of camphor-gum in a sufficient quantity of hot water. I then cool the mutton-tallow, beeswax, and castor-oil down to about 70° Fahrenheit, and then pour in the dissolved borax and camphor, and stir the whole until there is a perfect union of the ingredients.

This compound can be graded from the lightest to the heaviest admixture by slightly changing the proportion of the ingredients, so that it may be thus adapted for use upon journals of fast or slow running machinery.

What I claim as my invention is—

The lubricant herein described, consisting of mutton-tallow, beeswax, castor-oil, borax, and camphor, mixed in the manner and proportions herein described.

In testimony whereof I affix my signature in presence of two witnesses.

CHARLES J. INMAN.

Witnesses:
BEN SIMMONS,
WILLIAM. W. CAMPBELL.